Jan. 18, 1966 W. A. GRAHAM 3,230,166
JET FUEL DEHYDRATION PROCESS
Filed May 3, 1962 3 Sheets-Sheet 1

INVENTOR.
Ward A. Graham
BY Scofield, Kobzer, Scofield & Lowe
ATTORNEYS.

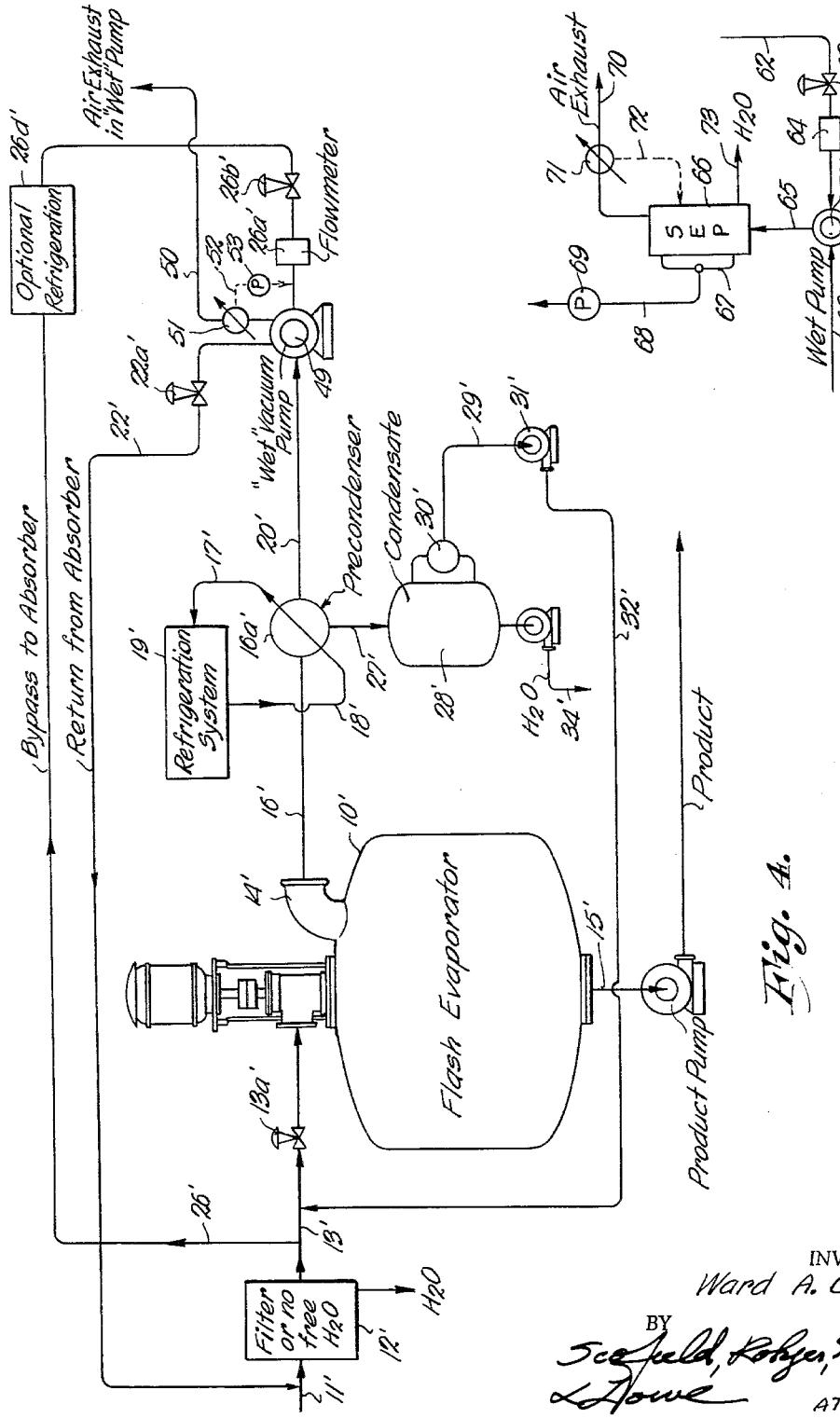

3,230,166
JET FUEL DEHYDRATION PROCESS
Ward A. Graham, Kansas City, Mo., assignor to Stratford Engineering Corporation, Kansas City, Mo., a corporation of Delaware
Filed May 3, 1962, Ser. No. 193,070
11 Claims. (Cl. 208—187)

This invention relates to methods of and apparatus for dehydration of liquid fuels for turbojet engines and refers more particularly to such methods and apparatus for continuous dehydration of same.

Immense quantities of hydrocarbon fuels are consumed daily in turbojet engines, particularly civilian and military aircraft. The problem of contamination of these fuels by bacteria, fungi, algae and the like is a serious one. Over a hundred species of these organisms have been found to contaminate jet fuels and consume it. Bacteria tend to select the long chain kerosene fuels, such organisms concentrating in the interface between free water in a jet fuel tank and the hydrocarbon itself. The bacteria and their by-products tend to corrode the fuel tanks and lines, plug filters and foul tank gauges.

Great efforts have been exerted in removing water, rust and sediment from jet fuels. Only the use of clean, dry fuel solves the problems of corrosion, plugging and fouling. A great problem is that the kerosene jet fuels tend to entrain and/or absorb water. It is difficult to separate free and dissolved water from relatively lower gravity and more viscous fuels. The use of rust inhibitors tends to merely further disperse water into the fuel whereby to provide more interface surface therebetween. The presence of surfactants (detergents) in fuels also tends to emulsify water into the fuels with the same results. There is a particular tendency to form and maintain stable water/fuel emulsions in such type of fuels. Surfactants get into the fuels from refinery treating methods (particularly hydrogen treating), chemical cleaning processes in refineries and pipelines and the use of inhibitors in petroleum products.

The soil and fresh and salt water, as well as the air, are constant sources of spores, and other microorganisms which create the results noted above. High fuel consumption in turbojet engines and high flow rates through the filters tend to load the same quickly. Providing effective filtering systems and heaters in the fuel flow lines for prevention of icing in aircraft adds to the weight of the aircraft, which is extremely undesirable.

Many precautions are currently being taken to prevent water from accumulating in the bottoms of fuel storage tanks and to keep such tanks and lines rust free. Thus, tanks are being coated and provided as sloping whereby to continuously drain to a limited area thereof any water therein. Continuous inspection is also employed.

Because of icing problems in aircraft fuels, aside from problems above-mentioned, the fuel free water content is made a part of any kerosene fuel specification. Thus, current specifications often cite, as an upper limit, 30 parts per million of free water and 2 milligrams per gallon of particulate matter. While kerosene fuel specifications limit the free water to figures like the above-given 30 parts per million, few fuel specification writers ever consider *dissolved* water in jet fuels, which can be extremely significant under many commonly occurring conditions. Thus, at 90° F., a not uncommon storage temperature for jet fuels, from 70 to 120 parts per million of water may be dissolved in the fuel, depending upon its particular characteristics. JP-4 fuels of the gasoline type and JP-5 fuels of the kerosene type each have a typical solubility envelope for water across a given temperature range. Thus, JP-4 type fuels typically have a solubility range from 0.0005 to 0.0010 weight percent at a temperature of minus 30° F., as compared to a range from 0.030 to 0.055 weight percent at 180° F. At 60° F. the solubility ranges from 0.0050 to 0.01 weight percent. JP-5 fuels typically vary in water solubility from a slightly lesser solubility range at minus 30° F. (on the high end only) to a slightly lower solubility range (on both the high and low ends) at 150° F. and 60° F. It may be seen, therefore, that the solubility of water in jet fuels is very substantial at common storage temperatures when it is considered that 30 parts per million is equivalent to 0.0030 weight percent of water in the given fuel. FIG. 2 shows the solubility envelopes discussed. Specification fuel, purchased at 90° F. can become off specification merely by lowering the temperature to 60° F.

A major problem of any vacuum process and apparatus which attempts to dehydrate jet fuel from dissolved water lies in the problem of "light end loss." Thus, in any turbojet fuel, which necessarily represents a mixture of particular hydrocarbons having a particular boiling point curve, there is a proportion thereof which will distill off first when heat is applied thereto or be drawn off by a vacuum flash evaporation system as a separate component from the major portion of the fuel. It is estimated that the said "light ends" that would be taken off in a vacuum evaporation system or a heat dehydration system would range from 0.2 to 4.0 percent by weight of the total fuel. This would represent a considerable loss of fuel and, additionally, would tend to change the characteristics of the fuel in an undersirable manner. Any process of dehydration of fuels to remove dissolved water by flash evopration must, therefore, meet the dual problems of (1) meeting the fuel specifications and (2) avoiding substantial loss of fuel in such process.

Therefore, an object of the invention is to provide methods of and apparatus for efficiently dehydrating jet fuel of both the kerosene and gasoline types.

Another object of the invention is to provide such methods and apparatus which will effectively return the light ends of the hydrocarbon fuel to the fuel itself after dehydration thereof, thereby assuring characteristics of product identical to feed.

Another object of the invention is to provide methods of jet fuel dehydration which may be adapted to various sorts of dehydration apparatus.

Another object of the invention is to provide methods of and apparatus for dehydrating jet fuels, which methods and apparatus are of such efficiency as to reduce the dissolved water content to essentially 0.001 percentage by weight or 10 parts per million.

Another object of the invention is to provide methods of and apparatus for jet fuel dehydration which may be installed in the vicinity of storage tanks or at a fueling depot or on a wheeled trailer whereby to effectively minimize the water content of turbojet fuels.

Other and further objects of the invention will appear in the course of the following description thereof.

In the drawings, which form a part of the instant specification and are to be read in conjunction therewith, an embodiment of the invention is shown.

FIG. 4 is a schematic flow diagram of a second arrangement of apparatus for carrying out jet fuel dehydration.

FIG. 5 is a partial flow diagram of a third apparatus arrangement.

Figure 1:
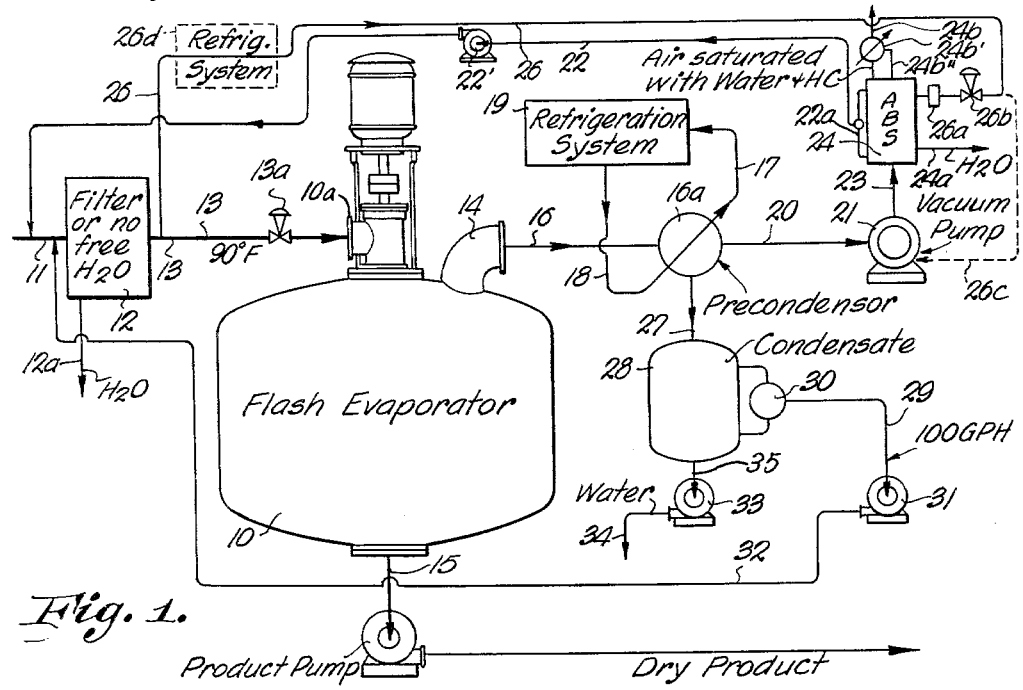
FIG. 1 is a schematic flow diagram of a first arrangement of apparatus for carrying out jet fuel dehydration.

Referring to FIG. 1, at 10 is illustrated schematically a dehydrating device which is preferably, but not necessarily, a flash evaporator such as is illustrated in the Charles W. Stratford Patent 2,368,049, or the H. W. Stratford Patent 2,990,011. Line 11 passes the feed hydrocarbon fuel to coalescing filter 12 to remove free water and particulate matter from the fuel. Water and particulate matter are passed from the filter through line 12a. From filter 12, line 13 passes possibly saturated fuel (but with no free water) to the input fitting 10a of the dehydrator 10 through back pressure valve 13a. For the purpose of the description, dehydrator 10 will be considered to be a flash evaporator of the rotating type shown in the H. W. Stratford Patent 2,990,011, supra. The internal construction and operation of the spray rotor in evaporator 10 will not be described in detail in view of the fact that such is fully described in the Stratford patent noted. Suffice it to say that the fuel is fed into a spray rotor with a controlled orifice from which it is discharged at high velocity against the inside surface of the vessel shell. Vacuum withdrawal line 14 removes water vapor and vaporized fuel "light ends" from the upper portion of the evaporator shell, while dehydrated liquid "product" fuel is withdrawn from the bottom of the evaporator shell through line 15 after running down the inside surface of the vessel wall.

It should be understood that any type of dehydrator means of sufficient capacity to remove substantially all of the dissolved water from the fuel at the desired fuel flow rate through the system may be substituted for the flash evaporator shown at 10.

Line 16 passes the water vapor and light end hydrocarbon vapors to precondenser 16a which is refrigerated by indirect heat exchange through flow lines 17 and 18 passing to and from any suitable conventional refrigerating means or system schematically designated at 19. From precondenser 16a, the vacuum withdrawal system is continued through line 20 to "dry" vacuum pump 21. Line 23 passes from pump 21 to absorber 24 from whence a recycle stream 22 driven by pump 22' returns to join line 11 before entry thereof into filter 12. Level control 22a regulates the quantity of this recycle flow. Bleed stream line 26 of feed hydrocarbons has flow meter 26a and back pressure valve 26b thereon and passes from line 13 after filter 12 to absorber 24. An optional secondary line 26c may be employed to pass free water free fuel to dry pump 21 to lubricate same. While a "dry" pump of this sort could operate for a limited period (a fraction to several hours) without requiring relubrication, the latter would be necessary periodically because of jet fuel absorption. Therefore, this pump is preferably operated hot enough to avoid such adsorption or lubricated with jet fuel, best the latter. Water drawoff line 24a takes water from the bottom of absorber 24 out of the system, while line 24b takes air saturated with H₂O and hydrocarbons from same. Condenser 24b' may be employed to liquefy the contents of line 24b with liquid recycle line 24b" returning condensed liquids to absorber 24.

Condensate from precondenser 16a is taken off through line 27 to accumulator 28. Recycle from condensate accumulator 28 is passed through line 29, controlled by level control 30 and driven by pump 31, and thence through line 32 to meet line 11. Water is drawn off the bottom of accumulator 28 through line 35 by pump 33 and passed out of the system by line 34.

Figure 2:
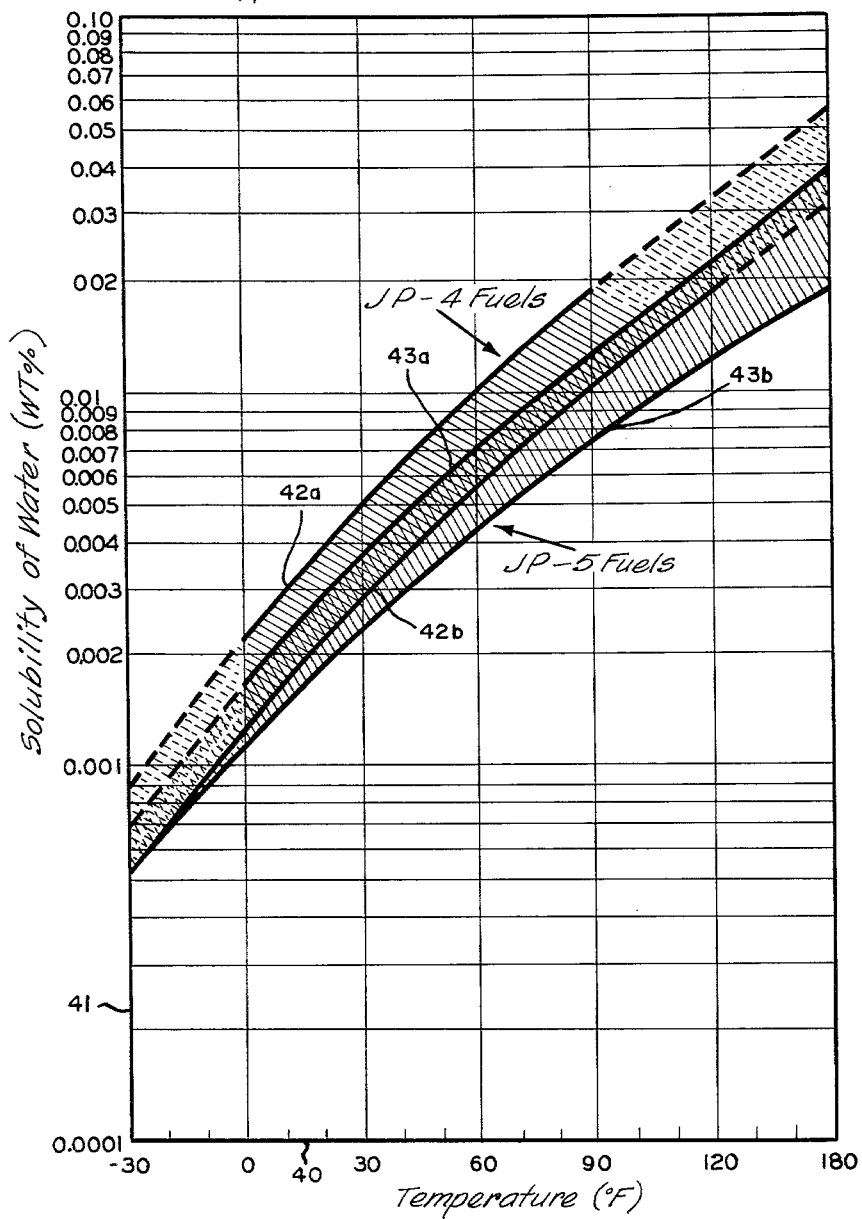
FIG. 2 is a graph illustrating the solubility of water in jet fuels, including both JP-4 and JP-5 type fuels.

Turning to FIG. 2, therein is indicated the solubility of water in typical jet fuels of the JP-4 and JP-5 types. Along abscissa 40 of the graph is measured temperature in degrees Fahrenheit from minus 30° F. to 180° F. Along ordinate 41 of the graph is measured the solubility of water in weight percent. As noted above, 30 parts per million of water is equivalent to 0.0030 weight percent of water in the given fuel. The JP-4 fuel solubility envelope is defined between lines 42a and 42b, while the JP-5 fuel solubility envelope is defined between lines 43a and 43b. The details of the curves, given above, will not be reanalyzed.

Figure 3:
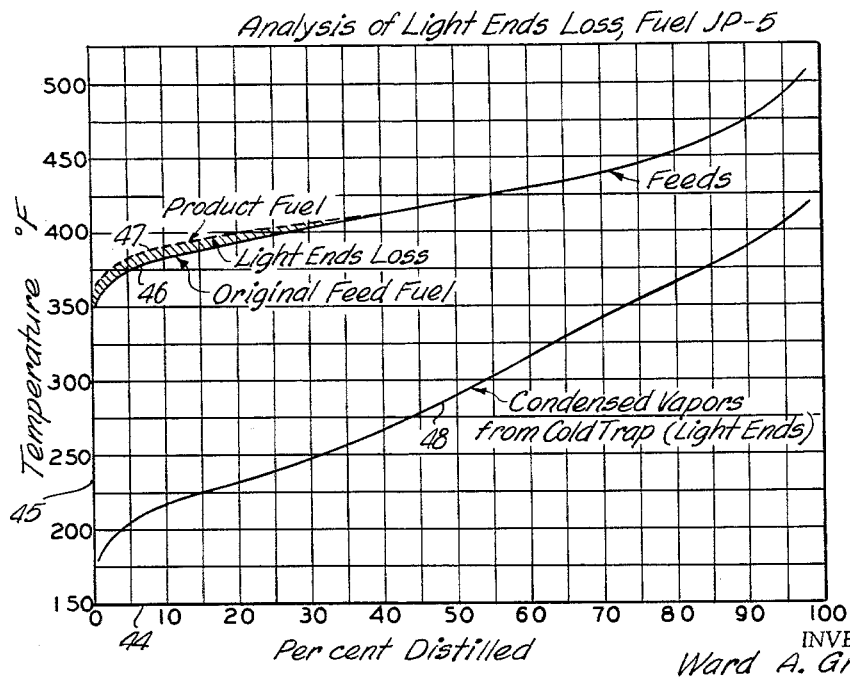
FIG. 3 is a boiling point curve for a typical kerosene or JP-5 fuel, including a curve for the original feed fuel, a secondary curve for the product fuel after removal of the light ends therefrom and a third curve for the condensed vapors of the light ends from the original feed fuel.

Referring to FIG. 3, therein is illustrated an analysis of light ends loss for JP-5 fuel. Abscissa 44 of the graph indicates the percent of the fuel distilled, while ordinate 45 of the graph designates the temperature in degrees Fahrenheit. Curve 46 corresponds to the original feed fuel indicating that distillation begins at 350° F. with substantially 100 percent of the fuel distilled at slightly over 500° F. Curve 47 is the boiling point curve for the product fuel after removal of the light ends therefrom. Curve 48 is for the condensed vapors of the light ends from the original feed fuel indicating an initiation of boiling slightly above 175° F. with substantially all distilled below 425° F.

In use of the refrigerated precondenser 16a, with recycle of condensate therefrom to the feed line 11, if the fuel feed to the evaporation or dehydration step is atomized for a finite and measurable period of time (as in a flash evaporator per one of the patents, supra) thus controlling the amount of volatile materials which may evaporate, a system may ultimately be established in equilibrium which permits delivering a product through line 15 of essentially the same quality as the feed.

In operation of the system shown in FIG. 1, recycle line 22 passes the recycle slip stream of light end-rich fuel hydrocarbons to the feed line 11 before filter 12. The circulation of the slip stream of feed material through line 26 into absorber 24 operates to provide a liquid body through which the vapor flow from vacuum pump 23 is passed. This absorption operation absorbs the hydrocarbon light ends which are pulled through the vacuum lines 16 and 20. The recycle of this flow can in most cases effectively eliminate any need for a precondenser as at 16a. However, the use of both in series provides an almost 100 percent recovery of the light ends lost if such is desired or required. In the case of more volatile materials, it is of significance to refrigerate (as at 26d) the slip stream of feed to be utilized as a seal in the absorber, whereby to permit operation of the vacuum system at lower pressures. Further reduction in hydrocarbon light ends losses to atmosphere is achieved by refrigerating vapors passed through line 24b and recycling condensate.

Referring to FIG. 4, therein is shown a system precisely like that of FIG. 1, with the exception that a "liquid seal" or wet vacuum pump is substituted for the absorber 24-vacuum pump 23 combination of FIG. 1. Because of the substantial identity between the two systems, parts common thereto and identical in function are numbered the same, but primed. These parts will not be redescribed in detail. Only the differences between the two systems will be set forth.

Thus, from precondenser 16a', the vacuum withdrawal system is continued through line 20' to "wet" vacuum pump 49. Recycle line 22' passes a recycle slip stream of light end-rich fuel hydrocarbons to feed line 11' prior to filter 12'. The flow through recycle line 22' passes through back pressure control valve 22a'. A slip stream of fuel hydrocarbons passes through line 26' having flow meter 26a' and back pressure valve 26b' thereon. The air exhaust from pump 49, saturated with hydrocarbons and water, is taken off through line 50. Condenser 51 is preferably employed on line 50 with liquid recycle line 52 having pump 53 thereon joining line 26 after meter 26a'.

Whether or not a precondenser 16a or 16a' is employed, the option of refrigeration of feed to the absorbers 24 or 49 is quite important. There is less cost in refrigerating and subcooling the slip stream of feed hydrocarbons than in condensing the vacuum system with the precondenser.

It is necessary to control the flow through wet pump 49 very carefully against the possibility of either filling up the pump and losing the pump capacity or functionability and excessive emptying of the pump and loss of pump action where the blades would miss the liquid in the greater diameter portion of the casing.

In the event of the use of a "liquid seal" or wet vacuum pump with circulation of a slip stream of feed material through the pump to serve as a liquid seal, (the feed-seal absorbing the hydrocarbon light ends pulled through the vacuum line) recycling the feed seal to the feed line 11 can effectively eliminate the need for a precondenser as at 16a. However, the use of both in series provides an almost 100 percent recovery of the light ends lost. Further reduction by refrigerating exit vapor line 50 is achieved. In the case of more volatile materials, it is of significance to refrigerate the slip stream of feed (as at 26d') to be utilized as the seal in the vacuum pump in the wet vacuum pump operation whereby to permit operation of the vacuum system at lower pressures.

A typical "liquid seal" or wet type vacuum pump is shown and described in the Chemical Engineering Handbook, 2nd edition, McGraw-Hill, 1941, page 1695, FIGS. 25a and b, also 3rd (1950) edition, page 990. A currently produced wet type vacuum pump of the centrifugal displacement type is shown in bulletin V-L-282-B of the Nash Engineering Company, South Norwalk, Connecticut, U.S.A. A general description of this typical conventional type pump would be a centrifugal displacement type of pump consisting of a round, multi-blade rotor revolving freely in an elliptical casing partially filled with liquid. Curved rotor blades project radially from the hub and form, with the side shrouds, a series of pockets or buckets around the periphery. The rotor revolves at a speed high enough to throw liquid out from the center by centrifugal force, resulting in a solid ring of liquid revolving in the casing at essentially the same speed as the rotor, but following elliptical shape of the casing. Thus it is seen that this alternately forces the liquid to enter and recede from the pockets or buckets in the rotor at a high velocity as the liquid passes into and out of chamber or casing zones of greater and lesser diameter. Following through a complete cycle of operation in the pump chamber, it is assumed that one starts with the rotor pocket full of liquid opposed to a lesser internal diameter casing or chamber zone. The liquid, due to centrifugal force, follows the casing, withdraws from the rotor as it reaches a greater diameter zone, and pulls air in through the inlet port in the hub of the rotor, the port connected with the pump inlet. At extreme internal diameter position in the elliptical rotor shape, the liquid has been thrown outwardly from the blade pocket in the rotor and has been replaced with air or gas. As rotation continues, the again converging wall of the casing forces the liquid back into the rotor chamber, compressing the air trapped on the chamber and forcing it out through the discharge port, connected with the pump discharge. The rotor chamber, having gone through a 180° rotation cycle is now again full of liquid and ready to repeat the cycle. The cycle takes place twice in each revolution. The liquid in the rotor chamber or casing is, as previously mentioned, a slip stream of the feed to absorb the light end hydrocarbons pulled into the chamber of the rotor in the vacuum withdrawal process. Inlet and outlet fittings if not already present on the casing, would be provided preferably opposed to one another at the zone where the blade pockets would be liquid full.

Referring to FIG. 5, therein is shown a modification of the system of FIG. 4 which is adapted to relieve the load on the vapor line on the wet vacuum pump (50 in FIG. 4) by reducing the quantity of liquid entrainment in said vapor line. Referring to FIG. 5, then, line 60 is taken from the low pressure removal line of the flash evaporator or from the discharge side of a precondenser in a manner analogous to line 20' of FIG. 4. Wet vacuum pump 61 is precisely analogous in structure and function to pump 49 in FIG. 4. Line 62 performs the equivalent function of line 26' of FIG. 4, namely, passing a by-pass flow of free water free jet fuel to wet vacuum pump 61. Line 62 has back pressure valve 63 and flow meter 64 thereon. Overhead line 65 carries both liquid and vapor to a separating vessel 66. Level control 67 controls the recycle or return from vessel 66 to the fuel feed line before the filter (per line 22' in FIG. 4). In the instant case, return line 68 has pump 69 thereon to produce the return flow. Air exhaust line 70 preferably has condenser 71 thereon with recycle line 72 leading from the latter back to the separator vessel. Water withdrawal line 73 may be employed on vessel 66, if desired.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A process of dehydrating hydrocarbon jet fuel of absorbed water therein comprising feeding fuel to be dehydrated into a low pressure dehydrating step to remove substantially all of said adsorbed water from said fuel, passing effluent vapors comprising water, light hydrocarbon ends and air from the dehydrating step to an absorbing step wherein light hydrocarbons and water in said effluent are absorbed from said effluent into a hydrocarbon medium of substantially the same character as the feed to the dehydrating step, separately recycling light hydrocarbons in said hydrocarbon medium from said absorbing step to the feed to the dehydrating step, removing the water portion of the absorbed effluent from the absorbing step and passing it from the system, and withdrawing substantially dehydrated fuel from the dehydrating step.

2. A process in claim 1 wherein hydrocarbon jet fuel is supplied to the system prior to the dehydrating step, free water is removed therefrom in a first separating step before the dehydrating step, the hydrocarbon portion of the condensate is recycled into the feed to the first separating step and the hydrocarbon recycled from the absorbing step is also recycled into the feed to the first separating step.

3. A process as in claim 1 wherein the absorbing step comprises passing the dehydrating step effluent through a wet vacuum pump having hydrocarbons of the character of the feed to the dehydrating step as the pump liquid medium.

4. A process as in claim 3 wherein the vacuum pump liquid medium is supplied from a slip stream from the feed to the dehydrating step.

5. A process as in claim 1 wherein the absorbing step follows a dry vacuum pump on the low pressure line from the dehydrating step.

6. A process as in claim 5 wherein the absorbing step liquid medium is supplied from a slip stream from the feed to the dehydrating step.

7. A process as in claim 1 including maintaining the temperature of the absorbing hydrocarbon medium in the absorbing step at a relative minimum.

8. A process as in claim 1 wherein air saturated with water and hydrocarbons passes from the absorbing step, the saturated air passes to a condensing step and liquid therefrom is recycled to the absorbing step.

9. A process of dehydrating hydrocarbon jet fuel of absorbed water therein comprising feeding fuel to be dehydrated into a low pressure dehydrating step of a character such as to remove substantially all of said absorbed water from said fuel, passing the vapor effluent, including water, light hydrocarbon ends and air from the dehydrating step to a precondensing step, condensing water and hydrocarbon light ends from the vapor effluent in said precondensing step, recycling the hydrocarbon portion of the condensate from the precondensing step to the feed to the dehydrating step, removing water from the precondensing step and passing it from the system, passing the vapor effluent from the precondensing step containing water, light hydrocarbon ends and air to an absorbing step wherein the light hydrocarbons and water in said precondensed effluent are absorbed from said effluent into a hydrocarbon medium of substantially the same character as the feed to the dehydrating step, separately recycling said light hydrocarbons in said hydrocarbon medium from said absorbing step to the feed to the dehydrating step, removing water from the absorbing step and passing it from the system, and withdrawing substantially dehydrated fuel from the dehydrating step.

10. A process as in claim 9 wherein hydrocarbon jet fuel is supplied to the system prior to the dehydrating step, free water is removed therefrom in a first separating step before the dehydrating step and the hydrocarbon recycled from the absorbing step is recycled into the feed to the first separating step.

11. A process of dehydrating hydrocarbon jet fuel of absorbed water therein comprising feeding hydrocarbon jet fuel to be dehydrated into a first separating step, removing free water from the jet fuel in said first separating step, then feeding said fuel into a low pressure dehydrating step of a character such as to remove substantially all of the absorbed water from said fuel, passing the vapor effluent from the dehydrating step comprising water, light hydrocarbon ends and air to a precondensing step, condensing water and hydrocarbon light ends from the vapor effluent in said precondensing step, recycling the hydrocarbon portion of the condensate from the precondenser into the feed to the first separating step, removing the water portion of the condensate separately from the precondensing step and passing it from the system, and withdrawing substantially completely dehydrated fuel from the dehydrating step.

References Cited by the Examiner
UNITED STATES PATENTS
2,368,497  1/1945  Shipley et al. _____ 208—187

DELBERT E. GANTZ, *Primary Examiner.*
ALPHONSO D. SULLIVAN, *Examiner.*